United States Patent Office 2,791,497
Patented May 7, 1957

2,791,497

METHOD OF PRODUCING LIGHT METAL POWDERS

Leo Schlecht, Ludwigshafen (Rhine), and Hermann Klippel, Hassloch, Pfalz, Germany, assignors to Badische Anilin- & Soda-Fabrik Aktiengesellschaft, Ludwigshafen (Rhine), Germany No Drawing. Application April 20, 1954,
Serial No. 424,490

Claims priority, application Germany April 24, 1953

7 Claims. (Cl. 75—.5)

This invention relates to improvements in the production of light metal powders from metal carbonyls.

In the thermal decomposition of metal carbonyls in the free space of a heated vessel there are usually formed fine metal powders of which the bulk density is usually between about 2 and 4 kilograms per litre. For many purposes, however, in particular for powder-metallurgical processing of the powder, for example for the production of porous electrode frameworks from carbonyl nickel powder for alkaline accumulators, it is advantageous to use a powder having the smallest possible bulk density, as for example below 1 kilogram per litre.

Such light metal powders have hitherto been obtained by raising the decomposition temperature because as a rule it is true that at lower temperatures, as for example between 100° and about 300° C., a dense, heavy powder is formed, whereas at higher temperatures, as for example above 300° to 400° C., light spongy metal flakes are formed.

Working at such high temperatures has the drawback, however, that side reactions occur, by the products of which the metal powder is contaminated. In particular the metal powder is contaminated by carbon due to the decomposition of carbon monoxide into carbon and carbon dioxide, and moreover metal oxide is formed by reaction of the carbonyl metal powder with the carbon dioxide formed.

Attempts have therefore been made to obtain light metal powder at lower temperatures, as for example below 300° C., by diluting the metal carbonyl vapour with gases, such as carbon monoxide or ammonia. This method is, however, also not always satisfactory because very large amounts of gas are necessary in order to reduce the bulk density of the metal powder for example below about 1 kg. per litre. Finally a light powder can also be obtained from a heavy metal powder prepared under normal conditions by mechanical separation, as for example sieving. Of necessity, however, there are formed, besides the light powder, considerable amounts of heavier powder for which there is not always a satisfactory use.

We have now found that light metal powder, in particular metal powder having a bulk density of less than 0.9 kg. per litre can be prepared by thermal decomposition of a metal carbonyl in the free space of a heated vessel by keeping the temperature of the wall of the reaction vessel, in particular in the neighborhood of the point of entry of the carbonyl, at least 270° C. higher than the temperature in the middle of the free space of the reaction vessel. By this great difference between the temperatures at the wall and in the free space it is possible to produce so many metal nuclei in the presence of still undecomposed carbonyl that the carbonyl further decomposes on the metal nuclei with the formation of very small spongy secondary particles which effect a substantial reduction in the bulk density of the powder. With the aid of this expedient of overheating the wall as compared with the free space of the reaction vessel, powder with an ususually low bulk density can be produced, for example a bulk density of 0.3 kg. per litre.

The setting up of the temperature difference can be effected without difficulty by keeping constant the supply of heat to the reaction vessel and increasing the carbonyl throughput and consequently the heat consumption and thereby lowering the temperature in the free space and thus increasing the difference between the temperatures of the wall and the free space to the necessary extent. However the carbonyl throughput may be kept constant and the supply of heat increased provided that the necessary temperature difference between the wall and the free space is achieved without such high temperatures occurring in the free space that the above-mentioned separation of carbon and the formation of metal oxides occurs to a troublesome extent. The temperature in the interior may also be reduced by the desired extent also by other means, as for example by the supply of cold gases or vapours.

Generally speaking temperature differences which are slightly above 270° C. are chosen. If it is desired to produce very light powders, however, the difference between the wall temperature and the internal temperature is adjusted to about 300° C., provisions being made at the same time to keep the internal temperature as far as possible below 300° C., as for example at 230° C. This is usually attained by supplying such an amount of carbonyl to the decomposition chamber that the effluent carbon monoxide still contains undecomposed carbonyl. The excess of metal carbonyl is, however, kept as small as possible so that the partial pressure of the carbonyl in the waste gas still lies considerably below the saturation pressure of the carbonyl at room temperature. In this way condensation of carbonyl in the metal powder is prevented and the risk of igniting the metal powder and of poisoning during sluicing out is reduced.

The process can be carried out at atmospheric, increased or reduced pressure. It is usual, however, to work at atmospheric pressure in order that simpler apparatus may be used.

The process is of special advantage in the production of nickel or iron-nickel powder from nickel carbonyl alone or together with iron carbonyl for the powder-metallurgical production of electrode frameworks for accumulators and of highly porous filter plates and tubes. For these purposes it has hitherto been usual to employ a carbonyl metal powder having a bulk density of about 0.9 kg. per litre. A powder lighter than this has not been worked up industrially for this purpose because its preparation has been too difficult. According to the present invention, however, it is possible to produce industrially in a simple manner a powder which is considerably lighter than that having a bulk density of 0.9 kg. per litre hitherto usual. For example from the very light nickel powder prepared in the said manner and having a bulk density of about 0.4 kg. per litre and less, accumulator electrode frameworks can be prepared which have an extremely high pore volume, as for example of more than 90%. Such highly porous accumulator electrodes have the advantage that the amount of nickel necessary for the production of the sintered framework is very small and that therefore the ratio of output to weight of the accumulator is considerably improved and moreover the cost of production is reduced. Into such a highly porous framework there can be introduced a larger amount of active mass, and this considerably increases the capacity of the accumulator.

The following example will further illustrate this invention but the invention is not restricted to this example.

Example

Nickel carbonyl vapour is introduced into an upright cylindrical container 1 metre in diameter and 5 metres in height, provided with a heating jacket. Different temperatures of the wall and the interior of the container are set up by varying the carbonyl throughput or the amount of heat supplied by means of the heating jacket. With various differences between the temperature at the wall and the temperature in the interior, nickel powder having different bulk densities are obtained, as may be seen from the following table.

TABLE

| Temperature of the wall at the point of entry of the nickel carbonyl vapour in °C. | Temperature in the interior in °C. | Difference in temperatures in °C. | Bulk density of the nickel powder in kg. per litre |
|---|---|---|---|
| 502 | 280 | 222 | 1.6 |
| 525 | 291 | 234 | 1.5 |
| 552 | 292 | 260 | 1.1 |
| 534 | 264 | 270 | 0.9 |
| 568 | 230 | 338 | 0.4 |
| 584 | 228 | 356 | 0.3 |

In the production of the powders with bulk densities of 0.4 and 0.3 kg. per litre, about 5 grams of nickel in the form of carbonyl are still contained in each cubic metre of the carbon monoxide leaving the decomposition chamber.

What we claim is:

1. In the process for the production of metal powders especially suitable to be processed by powder-metallurgical methods and having a bulk density of less than about 0.9 kg. per litre by the thermal decomposition of metal carbonyls in the free space of a heated vessel the step which consists in keeping the temperature of the wall of the vessel at least 270° C. higher than the temperature in the middle of the free space of the vessel.

2. In the process for the production of metal powders especially suitable to be processed by powder-metallurgical methods and having a bulk density of less than about 0.9 kg. per litre by the thermal decomposition of metal carbonyls in the free space of a heated vessel the steps which consist in keeping the temperature of the wall of the vessel at least 270° C. higher than the temperature in the middle of the free space of the vessel keeping said free space temperature below about 300° C., and maintaining such a throughput of carbonyl that the effluent carbon monoxide still contains undecomposed carbonyl which is at a partial pressure below the saturation pressure of the carbonyl at ordinary temperature.

3. In the process for the production of nickel powder especially suitable to be processed to porous electrode frameworks for accumulators by powder-metallurgical methods and having a bulk density of less than about 0.9 kg. per litre by the thermal decomposition of nickel carbonyl in the free space of a heated vessel the step which consists in keeping the temperature of the wall of the vessel at least 270° C. higher than the temperature in the middle of the free space of the vessel and keeping said free space temperature below about 300° C.

4. In the process for the production of nickel powder especially suitable to be processed to porous electrode frameworks for accumulators by powder-metallurgical methods and having a bulk density of a few tenths of one kg. per litre by the thermal decomposition of nickel carbonyl in the free space of a heated vessel the step which consists in keeping the temperature of the wall of the vessel at least 300° C. higher than the temperature in the middle of the free space of the vessel and keeping said free space temperature below about 300° C.

5. In the process for the production of nickel powder especially suitable to be processed to porous electrode frameworks for accumulators by powder-metallurgical methods and having a bulk density of a few tenths of one kg. per litre by the thermal decomposition of nickel carbonyl in the free space of a heated vessel the step which consists in keeping the temperature of the wall of the vessel about 300° to 350° C. higher than the temperature in the middle of the free space of the vessel and keeping said internal temperature as far as possible below 300° C.

6. In the process for the production of nickel powder especially suitable to be processed to porous electrode frameworks for accumulators by powder-metallurgical methods and having a bulk density of a few tenths of one kg. per litre by the thermal decomposition of nickel carbonyl in the free space of a heated vessel the step which consists in keeping the temperature of the wall of the vessel about 300° to 350° C. higher than the temperature in the middle of the free space of the vessel and keeping said internal temperature as far as possible below 300° C. while maintaining such a throughput of carbonyl that the effluent carbon monoxide still contains undecomposed carbonyl which is at a partial pressure below the saturation pressure of the carbonyl at ordinary temperature.

7. In the process for the production of nickel powder especially suitable to be processed by powder-metallurgical methods and having a bulk density of less than about 0.9 kg. per litre by the thermal decomposition of nickel carbonyl in the free space of a heated vessel, the step which consists in keeping the temperature of the wall of the vessel at least 270° C. higher than the temperature in the middle of the free space of the vessel.

References Cited in the file of this patent

UNITED STATES PATENTS

| 1,836,732 | Schlecht et al. | Dec. 15, 1931 |
| 2,663,630 | Schlecht et al. | Dec. 22, 1953 |

FOREIGN PATENTS

| 679,439 | Great Britain | Sept. 17, 1952 |